April 22, 1930.  H. G. WEYMOUTH  1,755,905
METER
Filed April 6, 1929    2 Sheets-Sheet 1
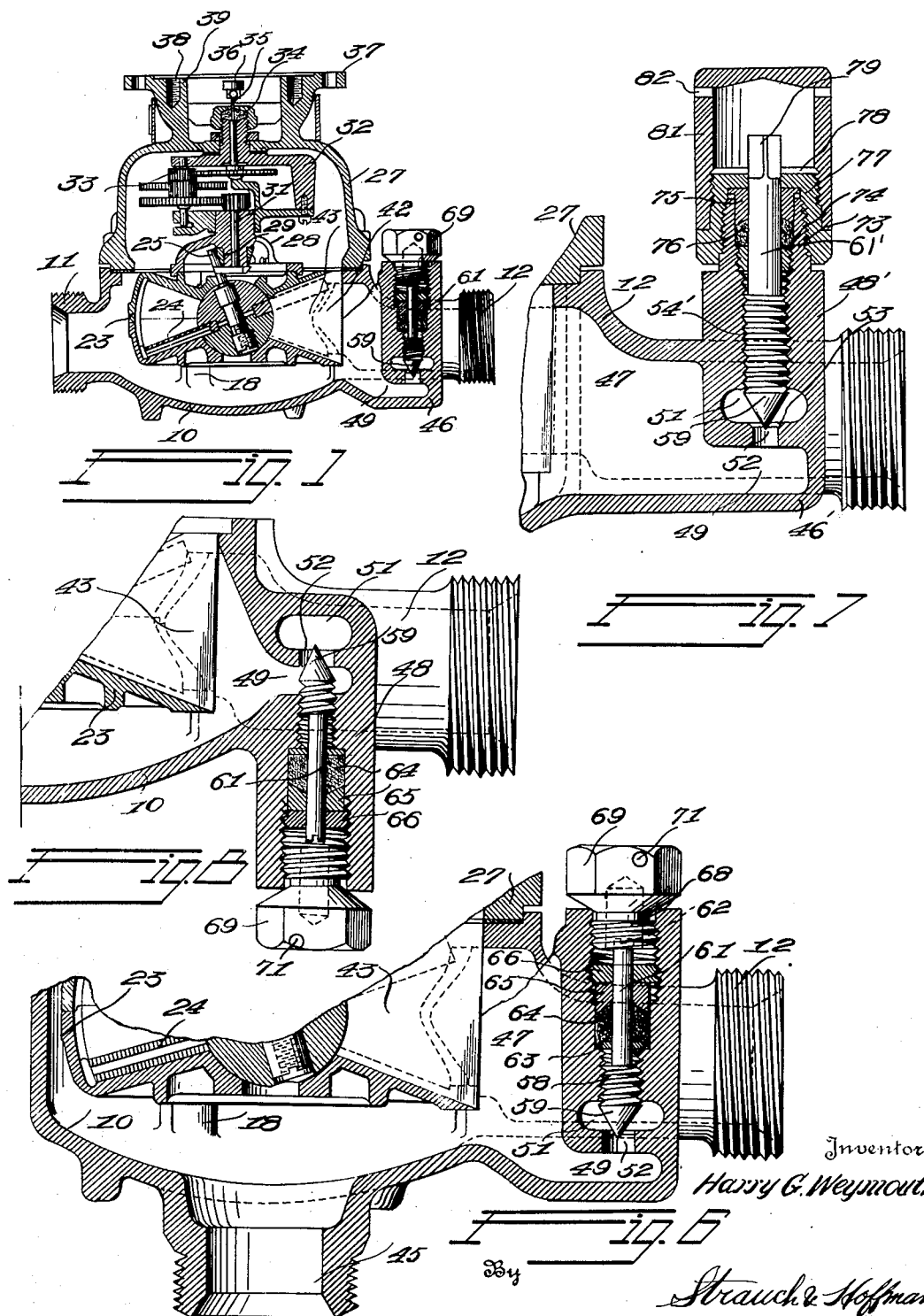
Inventor
Harry G. Weymouth
By Strauch & Hoffman
Attorneys

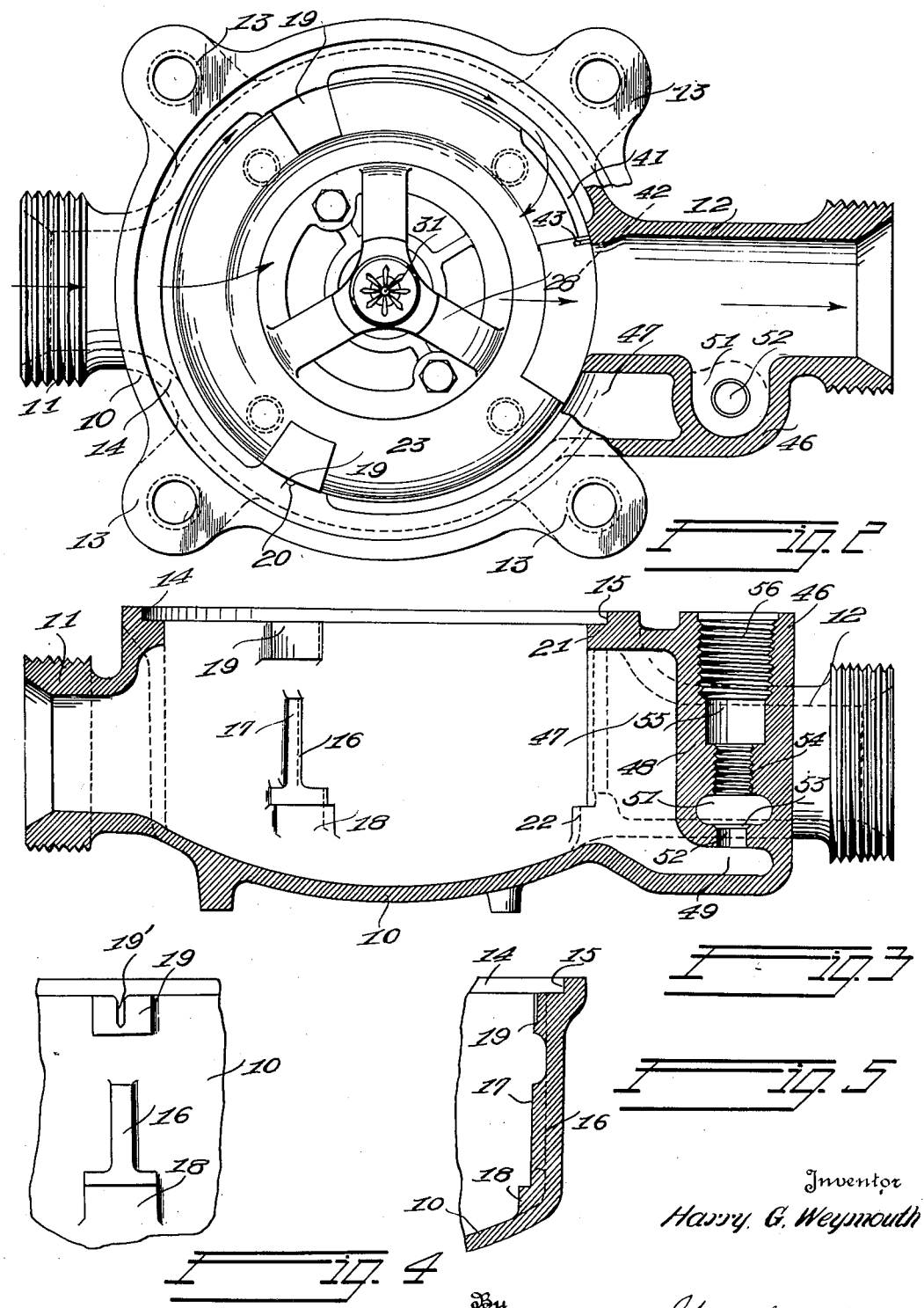

Patented Apr. 22, 1930

1,755,905

UNITED STATES PATENT OFFICE

HARRY G. WEYMOUTH, OF PITTSBURGH, PENNSYLVANIA, ASSIGNOR TO PITTSBURGH EQUITABLE METER COMPANY, OF PITTSBURGH, PENNSYLVANIA, A CORPORATION OF PENNSYLVANIA

METER

Application filed April 6, 1929. Serial No. 353,187.

The present invention relates to meters.

More particularly the invention relates to by-pass constructions in liquid meters for adjusting the rate of flow therefrom for correcting any inaccuracies between the volume of liquid passed and the registration indicated by the registering mechanism associated with the meter.

The by-pass constructions herein disclosed while applicable to liquid meters in general are specially designed and particularly intended for use in gasoline measuring meters.

Meters employed in liquid dispensing apparatus have heretofore been provided with by-pass constructions, whereby a portion of the liquid may be by-passed from the meter casing into the outlet therefrom in variable amounts, adjustable means being provided for varying the flow through the by-pass for correcting any differences between the quantity of gasoline dispensed and the registration indicated by the register operatively connected with the meter. These constructions do not give uniform results because the by-passes heretofore proposed are located at points in the meter at which the liquid is more or less turbulent depending upon the pressure or rate of flow at the time, though the degree of turbulence is not directly proportional to either of these factors, but depends in large measure on the rapidity with which changes in pressure and rate of flow take place. Such changes occur at irregular intervals; causing turbulence in the liquid that results in irregular flow through the by-pass differing from the expected flow under pressures then existing.

Liquid dispensing systems frequently employ meters of the well known nutating disk type, and the by-pass constructions heretofore proposed have been applied to meters of this type. Such meters inherently cause a turbulence of the liquid because of the tortuous nature of the path of the liquid passing therethrough and because of the necessity for reversing the direction of flow a number of times in passing through the meter. I have discovered that by properly locating the by-pass, far better correspondence between the expected and actual flow through the by-pass may be brought about, for various pressures and rates of flow in meters of the type just referred to.

In the meter constructions of the nutating disk type, now in use, the inlet and outlet openings in the measuring or disk chamber are in proximity to each other with the inlet opening disposed immediately to the left of the meter casing outlet connection looking in the direction of flow through the inlet and the disk chamber is disposed within the meter casing with the outer wall thereof in spaced relation to the inner wall of the meter casing providing a substantial space which is always filled with gasoline and which gasoline upon flow from the inlet to the outlet connection is always subjected to a surging movement toward the inlet opening in the disk chamber. This causes turbulence of the liquid that is most pronounced at point immediately to the left of the outlet connection. At a point immediately to the right of said outlet connection in the space between the casing and the measuring chamber no substantial movement of the liquid normally takes place, and I have found that if the by-pass is located at this point or adjacent thereto the expected flow through the by-pass and the actual flow substantially correspond for various pressures, or rates of flow.

In some constructions heretofore proposed, the by-pass, provided to permit a portion of the flow to be diverted around the meter, so that the liquid delivered by the dispensing apparatus may include that by-passed as well as that passing through the meter, have included relatively long and narrow passages through the casing of the meter, the intended rate of flow through such long passages being controlled by an adjustable valve. With these constructions the flow through the by-pass did not vary in accordance with the changes of pressure in the system. In the dispensing of gasoline, for example, the pressures may vary within relatively wide limits due to the fact that the controlling nozzle or valve that determines the rate of discharge from the system may be wholly or only partly open. This causes a wide variation in the pressures in the system. In order to secure an accurate delivery of the desired amount of fluid, the flow through the by-pass should vary in exact accordance with the variations of flow through the meter. Gasoline dispensing systems have recently gone into rather wide use, in which the control of the flow from the dispensing system is governed by a valve that is manipulated by hand and held in its open position manually while the gasoline is being dispensed. In actual practice, sometimes the valve is maintained continuously wholly opened, and in other instances it is continuously held partially opened, and in still other instances it is permitted to fluctuate within relatively wide limits, introducing rapid fluctuations in the pressure in the system. In relatively long and narrow by-passes of the type just referred to, such fluctuations in pressure are not transmitted through the restricted passages in such manner as to effect the rate of flow through the by-pass in proportion to such fluctuation. I have discovered that this source of inaccuracy in the meter may be obviated by providing a relatively short by-pass, or, if the by-pass is of substantial length, by providing relatively wide passages extending to and from the by-pass proper, the effective transverse area of said passages being made many times the transverse area of the by-pass. In this manner the fluctuations in pressure are readily transmitted to the fluid immediately adjacent the by-pass proper on both sides thereof, so that, in view of the further fact that the by-pass itself is made very short, the flow through the by-pass fluctuates in strict accordance with fluctuations in pressure in the system. This is the desideratum for accurate delivery of liquids irrespective of variations of pressures in the system, and it is attained by the construction presently to be described.

It is accordingly a primary object of this invention to provide a by-pass construction in a liquid dispensing meter whereby any difference between the volume of gasoline dispensed and that indicated by the register can not only be secured by adjusting a by-pass valve but can be accurately maintained under variable conditions encountered in operation of the meter.

It is a further object of the present invention to provide a by-pass construction in a liquid meter disposed at a point in which the liquid is normally quiescent.

It is a still further object of the present invention to provide a liquid meter having a short by-pass arranged so that fluctuations in pressure will affect the flow through the by-pass in exact accordance as such fluctuations affect the rate of flow through the meter itself.

With these objects in view as well as others that will become apparent from the following disclosure reference will be had to the accompanying drawings forming part of same, and in which:

Figure 1 is a vertical longitudinal sectional view of a gasoline meter disclosing a preferred form of by-pass construction.

Figure 2 is a top plan view of the bottom meter casing partially broken away and in longitudinal section disclosing particularly the by-pass construction and the path of movement of the gasoline within the casing, the disk or measuring chamber being shown in top plan mounted in operative position in said casing.

Figure 3 is a vertical longitudinal sectional view of the structure illustrated in Figure 2 with the disk chamber removed.

Figures 4 and 5 are respectively fragmental elevational and transverse sectional views disclosing structural details of the meter casing.

Figure 6 is a broken vertical longitudinal sectional view of the construction illustrated in Figure 1 in which the meter casing is provided with a bottom inlet connection.

Figure 7 is a fragmental vertical longitudinal sectional view showing the by-pass construction provided with a modified adjusting means.

Figure 8 is a view similar to Figure 7 disclosing a bottom adjustment.

Referring to the drawings by reference characters in which like characters designate like parts, 10 designates the lower meter casing which casing, as clearly illustrated in Figure 3, comprises an inlet connection 11 and an outlet connection 12. Casing 10 is provided at the margin thereof with tapped bolt receiving lugs 13 and is provided with an annular recess 14 defining a shoulder 15 for a purpose later referred to. Formed integrally with the inner wall of casing 10 adjacent inlet 11 are a pair of lugs 16 each of which comprises a vertically extending disk chamber spacing portion 17 and a substantially thickened chamber supporting portion 18 and formed integrally with casing 10 directly above and in spaced relation to each portion 17 is a chamber spacing lug 19 the top of which is flush with the bottom of recess 14. Casing 10, opposite outlet 12, and in equally spaced relation to lugs 16 and 19, is provided with a short integral inwardly projecting wall 21, surrounding and contacting in fluid-tight manner with the outlet from the disk chamber. Said wall embodies a widened base portion 22 co-operating with portions 18 in supporting the disk chamber spaced above the bottom of casing 10. The inlet opening in connection 11 is in communication with chamber 10. Removably disposed in casing 10 is a nutating disk chamber 23 provided with the usual nutating disk 24 and register operating spindle 25 operated thereby. Chamber 23 is supported on lug portions 18 and 22 in spaced relation to the bottom of casing 10 as indicated in Figure 1 and the lateral circular wall of chamber 23 is maintained in spaced relation to the inner side wall of casing 10 by lugs 16, 19 and wall 21, thus providing a liquid circulating space within chamber 10 and around chamber 23. The spaces between lugs 16 and 19 provide for the passage of the liquid through said space but said lugs substantially restricting the movement thereof thus avoiding pronounced turbulence swirling or surging of the liquid upon flow thereof from inlet 11 through casing 10, disk chamber 23 and outlet 12. One of the lugs 19 is provided with a vertical recess 19' (Figure 4) for receiving a locating projection 20 on chamber 23 for accurately positioning chamber opening 41 and 42 with respect to casing 10.

Detachably supported on casing 10 is an upper or gear train casing 27, which is secured in usual manner, as by bolts screw threaded into lugs 13 of casing 10. Detachably connected with the outer wall of chamber 23 is a control frame 28 provided with the usual spindle engaging roller 29 and the gear operating spindle 31. Detachably secured to frame 28 is the gear supporting frame 32 provided with the usual reduction gear train 33, stuffing box 34 and register mechanism operating spindle 35 provided with the pinion 36 for operative engagement with the lower gear of the usual register operating mechanism supported in a box detachably secured to the outer end of casing 27. Said box is attached to apertured lugs 37, while the separate register mechanism is secured to casing 27 by bolts engaging taps 38 in lugs 39 of casing 27 or in any other approved manner.

In the construction described, liquid enters inlet 11 into the space around chamber 23 in casing 10 and flows around chamber 23 as indicated by the arrows in Figure 2, from which the liquid enters chamber 23 through an inlet opening 41 changing its direction of flow in so doing. Said opening, as indicated in Figure 2, is immediately to the left of outlet connection 12. The liquid then passes around chamber 23 again changing its direction of flow, while imparting a nutating or wabble motion to disk 24. The liquid then passes out of chamber 23 through an outlet opening 42 therein which is in direct communication with outlet 12. Outlet 42 is separated from inlet opening 41 by a partition 43, as indicated in Figures 1 and 2.

During passage of liquid through chamber 23 in the manner above described motion is imparted to gear train 33 through spindle 25 which in turn imparts movement through spindle 35 to the register mechanism in well known manner.

While the inlet connection 11 is disclosed as being provided on the side of casing 10 opposite and in longitudinal alinement with outlet 12 in Figures 1, 2 and 3, the inlet connection may be provided on the bottom of casing 10 centrally thereof as indicated at 45 in Figure 6, the location of the inlet connection depending upon the particular application of the meter. In this form of the invention the liquid circulates around casing 23 to opening 41 and then around dividing partition to outlet 42. In view of the number of reversals in the direction of flow it will be understood that the liquid in this form of the invention as in the above form, surges and swirls as it passes through the meter, and that the degree of this action, in view of the variations possible in the course of the liquid, varies at different points in the casing 10 and disk chamber 23.

The construction above described and the operation thereof is in general, quite similar to meters of this character now in use. Said meter, however, is provided with an adjustable by-pass constituting an essential part of the present invention. In construction and purpose the by-pass is similar to by-pass constructions heretofore proposed. However, the constructions heretofore used included a by-pass construction located at a point where the liquid in the meter casing is subjected to turbulence or surging action varying in degree according to the pressure and rate of flow through the meter. The by-pass of this invention is located at a point in the casing at which the liquid is quescent even when large flows take place. To this end casing 10, to the right of outlet 12, is provided with an extension 46 providing a chamber 47 in communication with casing 10 and a solid portion 48 projecting in to chamber 47 defining therewith a passage 49 extending below portion 48. Portion 48 is provided with a chamber 51 which is in communication with outlet 12, and is also in communication with opening 49 through a port 52 comprising the by-pass proper, which port is provided with a valve seat 53 at the outer end thereof, communicating with chamber 51.

It will be observed that the width as well as the height of chamber 47 is relatively great compared to the diameter of the port 52 and the height of the casing 10 respectively and that the width of passage 49 is relatively great compared to the diameter of the by-pass. It will be observed further that as the width of the chamber 51 is substantially greater than the diameter of the port opening. By virtue of the large cross sectional area or size of the chambers 47 and 51 and the passage 59, the liquid that enters these chambers and traverses the passage, just referred to, is readily subjected to the pressure existing in the meter casing and in the meter outlet. It will be observed further that the port 52 is relatively short so that no relatively long bent column of liquid is disposed in the by-pass at any one point. Accordingly, the liquid flowing through the by-pass proper is immediately subjected to the pressure maintained in the system not only when it enters the by-pass but when it leaves it and relatively slight changes in pressure immediately manifest themselves in a variation in the rate of flow through the by-pass. Accordingly, the rate of flow through the meter and the flow through the by-pass will fluctuate substantially proportionately upon pressure changes.

Portion 48 is provided with a threaded bore 54 in communication with chamber 51, which bore at the outer end thereof communicates with a chamber 55. Portion 48 is provided with a threaded bore 56 extending from the outer end thereof to chamber 51. Said bore is of somewhat greater diameter than chamber 55. Engaged in bore 54 is the screw portion 58 of a conical valve 59, the stem 61 of which projects outwardly into bore 56 and is provided with a kerf 62 for receiving a screw driver or other suitable instrument for turning stem 61 in order to thread portion 58 inwardly or outwardly in bore 54 and thereby moving valve 59 toward or away from seat 53 for permitting more or less fluid to by-pass from casing 10 into outlet 12 through chamber 47, opening 49, port 52 and chamber 51.

Disposed in chamber 55 in surrounding relation to stem 61 is a washer 63 on which is seated within chamber 55 a suitable packing 64 for providing a leak proof seal around valve stem 61. Resting on packing 64 and slidably disposed on stem 61 is a follower 65 which is maintained in tight engagement with packing 64 by a threaded plug 66 threadedly engaged in bore 56, and through which stem 61 projects, the plug 66 being provided with a kerf or other tool engaging member for turning plug 66 into bore 56. Threadedly engaged in the outer end of the bore 67 is a hollow shank 68 of a nut 69, the outer end of stem 61 projecting into the hollow shank 68. The nut 69 serves as a cap to provide a means for preventing ready access to stem 61 for rotation thereof to adjust valve 59. In order to prevent unauthorized adjustment of valve 59, nut 69 is provided with a hole 71 for the reception of a sealing wire, said wire passing through a suitable aperture in the adjacent casing and through the hole in nut 69 so that the latter cannot be removed without breaking the sealing wire. The breaking of seal wires is a violation of law.

In operation of the construction described liquid enters inlet 11, passes through chamber 23 through opening 41 and outward therefrom through opening 42 into outlet 12. If the register mechanism associated with the meter accurately registers the volume of liquid being dispensed through outlet 12 valve 59 will be closed thus preventing and by-passing of the liquid. If however it should be found on test that the volume of liquid being dispensed does not correspond with that indicated on the register, valve 59 will be adjusted by an authorized person for by-passing some of the liquid from chamber 10 into outlet 12 through chamber 47, opening 49, port 52 and chamber 51. The meters are constructed so as to give a flow no greater than the desired volume for each rotation of the meter, the by-pass being relied upon to bring the delivery from the outlet up to the required value.

Upon reference to Figure 2 it will be seen that the space in casing 10, surrounding chamber 23 is always filled with liquid and upon the entrance of liquid through inlet 11 liquid is forced through opening 41 into chamber 23 imparting metering movement to disk 24 and that the liquid then passes out of chamber 23 through opening 42 directly into the outlet 12.

Upon further reference to Figure 2 it will readily be observed that due to the continuous movement of liquid from inlet 11 through chamber 23 and outlet 12 that the liquid in casing 10 surrounding chamber 23 is subjected to the turbulent or surging action above referred to, which will be pronounced adjacent inlet 41 of chamber 23 or to the left of outlet 12. The liquid in casing 10 will be subject to such action throughout other portions thereof the extent of this action varying with the pressure and rate of flow. It will be observed, viewing Figure 2, that on the side of outlet 12 opposite opening 41, the liquid is relatively quiet due to the fact that no outlet from this point in casing 10 to chamber 23 is provided so that no active circulation of the liquid takes place at this point. For this reason the by-pass inlet is arranged at said point, so that no matter at what rate the liquid is flowing through the meter, no turbulence or surging of the liquid causing variable quantities of liquid to by-pass at the same pressure will occur. The accuracy of the meter is thus greatly improved over constructions heretofore proposed in which the by-pass is located at other points in the meter.

The projections 18, 19 and 22 and the ribs 16 as well as the wall 21 contribute to the effectiveness of the action just described by limiting the swirling action of the liquid in the annular space between the outside walls of chamber 23 and the inner walls of casing 10, minimizing eddy currents and further insuring thereby the relative quiet of the liquid at the point at which it is by-passed.

In Figure 7 is illustrated a modification of the invention in which extension 46' projects further outwardly than projection 46 and which in the solid portion 48' thereof is provided with a threaded bore 54' which extends from the outer end of portion 48' to chamber 51. Portion 48' is provided with a tubular extension 73 which at the inner end thereof is internally threaded for the detachable engagement of an externally threaded plug 74. Slidably mounted in the outer end of tubular extension 73 is a follower 75 between which and plug 74 is positioned a suitable packing 76 which is maintained in a suitably compressed condition by means of an internally threaded cap 77, threadedly engaged with the outer threaded surface of extension 73. Cap 77 is provided with a kerf 78 for reception of a tool for threading cap 77 onto and off of extension 73. Valve stem 61' projects through plug 74, packing 76, follower 75 and cap 77 and is provided with a tool engaging angular head 79 for adjustment of valve 59. Threadedly engaged with cap 77 is a protecting and sealing cap 81 provided with transversely alined apertures 82 for receiving the usual sealing wire. It will be observed that the chambers 47 and 51 as well as the passage 49 in this form of the invention are relatively large and that the by-pass passage proper, which comprises port 52, is very short in length. This results, as above pointed out, in a ready transmission of the pressure in the meter and its outlet to the liquid in and adjacent to the by-pass, so that the flow through the by-pass will vary strictly in accordance with pressure variations however slight.

In operation, valve 59 is adjusted toward or away from seat 53 for regulating the by-pass flow by adjusting valve 59 upon rotating stem 61' in a manner similar to that described in connection with the first form of the invention.

In Figure 8 is illustrated a still further modification of the invention embodying a bottom adjustment which is effected by a reversal of the parts illustrated in Figures 1, 3 and 6 in which portion 48 extends vertically downwards instead of upward and chamber 51 communicated with outlet 12 adjacent the top thereof instead of the bottom and opening 49 is disposed substantially centrally of outlet 12. By the provision of a bottom adjustment portion 48 is disposed closer to chamber 23 than in the top adjustment and communicates with casing 10 directly thus eliminating chamber 47. However, it will be noted that the liquid entering the short by-pass is subjected without diminution to the pressures in the casing and in outlet 12 as in the forms above described.

As the valve and valve guiding means are the same as those illustrated in the first form of the invention they are designated by the same reference characters.

In operation of the bottom adjustment the by-pass flow is regulated in the same manner as in the top adjustment but the bottom adjustment may in certain set ups be more accessible than the top adjustment. It will be seen from the foregoing disclosure that a meter by-pass construction is provided by means of which any inaccuracies between the register reading and the liquid delivery may be readily and accurately adjusted, and that a by-pass construction is provided in which the flow will vary in substantially exactly the same ratio as the flow varies with changes in pressure through the meter itself.

While I have described and illustrated certain specific embodiments of my invention it is to be understood that they are merely illustrative and not restrictive, and that various changes, modifications, substitutions, omissions and additions may be made without departing from the spirit and scope of the invention which is defined in the subjoined claims.

What I claim and desire to secure by U. S. Letters Patent is:—

1. A liquid meter comprising a casing provided with an inlet and an outlet, a measuring chamber in said casing in spaced relation thereto defining a liquid chamber between the casing and measuring chamber; said measuring chamber provided with an inlet opening in communication with said liquid chamber and an outlet opening in communication with said casing outlet, said measuring chamber inlet opening being disposed at one side of and adjacent to said casing outlet, a by-pass between said liquid chamber and said casing outlet; said by-pass being located on the opposite side of said casing outlet from said chamber inlet, and means for regulating the flow through the by-pass.

2. The combination defined in claim 1 in which said by-pass having relatively wide passages in communication with said casing outlet and with said liquid chamber respectively and in communication with each other through a relatively short and narrow port with which said regulating means cooperates.

3. A fluid meter comprising a casing having an inlet and an outlet, a measuring chamber disposed within said casing and provided with an inlet and outlet, said last-named outlet and inlet being disposed side by side and with the outlet connection of said casing in communication with said chamber outlet, said casing having a passage to permit a flow from said casing directly to said casing outlet, said passage opening into said casing at a point thereof at the side of the measuring chamber outlet opposite from that of the measuring chamber inlet, and an adjustable valve to control the flow through said passage.

4. A fluid meter comprising a meter casing having an inlet and an outlet, a measuring chamber having an inlet and outlet disposed side by side and positioned within said casing with the chamber outlet in communication with the casing outlet, said casing having a direct passage from said meter casing to said casing outlet opening into the casing at a point thereof located on the side of the casing outlet opposite to that adjacent the chamber inlet, and an adjustable valve to control the flow of fluid through said passage.

In testimony whereof I affix my signature.

HARRY G. WEYMOUTH.